July 7, 1970 L. LUDIN 3,519,940
VOLTAGE-DEPENDENT CAPACITANCE CIRCUIT FOR CAPACITIVE SENSOR
Filed May 20, 1966
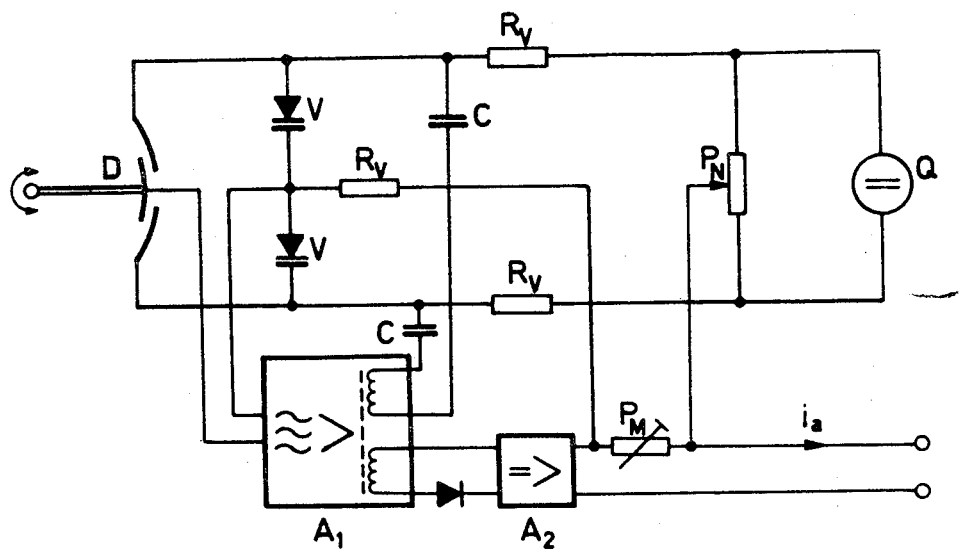
Inventor
LUDWIG LUDIN
By F. K. Jenkins, Agent United States Patent Office 3,519,940
Patented July 7, 1970

3,519,940
VOLTAGE-DEPENDENT CAPACITANCE CIRCUIT FOR CAPACITIVE SENSOR
Ludwig Ludin, Anglikon, Wohlen, Aargau, Switzerland, assignor to Camille Bauer Messinstrumente Aktiengesellschaft, Wohlen, Aargau, Switzerland, a corporation of Switzerland
Filed May 20, 1966, Ser. No. 551,706
Claims priority, application Germany, May 29, 1965, H 56,179
Int. Cl. G01n 27/22
U.S. Cl. 328—1        1 Claim

ABSTRACT OF THE DISCLOSURE

A capacitive pick-off transducer for converting a sensed physical quantity into an electrical signal by means of an input differential capacitor in one branch of a bridge. The other branch of the bridge contains a roughly balancing differential capacitor whose individual capacitances vary with applied voltages across them. The output from the bridge is led to an oscillator amplifier part of whose output is fed back to the bridge and another part rectified for producing a voltage for the roughly balancing capacitor, the rectified part corresponding to said signal.

---

This invention relates to a capacitive pickoff or transducer comprising a capacitive input member having a capacitance which changes according to the changes of a sensed physical quantity.

In conventional capacitive pickoffs the change in capacitance produced by a change in the sensed physical quantity is converted into a different electrical quantity. Pickoffs or transducers of such a kind are frequently used as position indicators and the variable capacitance is provided by a capacitor comprising fixed and movable vanes. The movable vanes are mechanically coupled to a movable element, such as the pointer of an indicating instrument, whose position is to be converted into an electrical quantity. However, such input members can also be used in arrangements in which the physical quantities are directly responsible for a change in capacitance. In conventional transducers of the afore-described kind the change in capacitance is generally measured in a bridge by the deflection of the pointer of a measuring instrument.

The pickoff or transducer proposed by the present invention differs from these known forms of transducer in that the change in capacitance of the input member is compensated by a voltage-dependent capacitance change. The output current or a voltage functionally depending thereon of the compensating circuit may be used as a measure of the change in capacitance that has taken place.

Voltage-dependent capacitors are known in the trade as "varicaps." These have the property of changing their capacitance when a biasing D.C. voltage is applied to them. It has already been propsed to combine voltage-dependent capacitors and other resistors in an A.C.–fed bridge circuit which is unbalanced by the D.C. voltage it is desired to measure, the bridge output being an A.C. voltage which is capable of amplification.

In contradistinction thereto the present invention consists in compensating a change in the capacitance of an input member caused by a sensed physical quantity by a corresponding voltage-induced capacitance change in such a way that an electrical measuring quantity can be derived from the D.C. voltage required for compensation.

In the proposed arrangement both the variable capacitance of the input member and the voltage-dependent capacitance required for compensation may be provided by differential capacitors. A preferred embodiment of the invention consists in including a bridge circuit formed by the input capacitor and the voltage-dependent capacitors in the feedback of an oscillating H.F. amplifier which delivers a D.C. output component corresponding to its input voltage, and in substantially compensating the capacitance change of the input member by a change in capacitance of the voltage-dependent capacitors brought about by a voltage derived from the D.C. output of the H.F. amplifier.

In order that the nature of the invention may be more readily understood reference will now be made to the accompanying drawing which in diagram form schematically illustrates an embodiment of a pickoff according to the invention. However, it is to be understood that the invention is not intended to be limited to the particular form of construction exemplified in the drawing.

In the illustrated pickoff transducer the input member is a variable capacitor which changes its capacitance according to the angular position of one of its elements. This input member is intended to function as a non-contact making pickoff for converting the annular portion of a shaft into a direct current proportional to the angular position of the shaft. The illustrated apparatus functions as a self-balancing capacitive bridge circuit. A change in the angular position of the shaft changes the capacitances of a differential rotary capacitor D, causing temporary unbalance in a bridge constituted by the two voltage-dependent capacitors V and the said differential capacitor D. The change in capacitance affects the feedback of the HF amplifier $A_1$ which is thereby induced to oscillate at a frequency of about 2 mc./s. Some of the high frequency is coupled out and fed through a rectifiying diode to a D.C. amplifier $A_2$. The impressed D.C. in the output of the D.C. amplifier is developed across an adjustable resistor $P_M$. The two voltage-dependent capacitors are biased by the stabilising D.C. source Q through resistors $R_V$. The voltage drop across the resistor $P_M$ adds to the biasing voltage and changes the capacitance of the voltage-dependent capacitors until the capacitance bridge is again roughly in balance, a slight degree of unbalance remaining which is necessary to sustain the output current $i_a$.

The biasing voltage of the voltage-dependent capacitors may be adjustable by a potentiometer $P_N$. This permits a zero output current to be associated with any desired initial position of the shaft. The pre-set $P_M$ permits the angular deflection to be matched to the variability range of the output current.

The HF circuit comprises the capacitance bridge in the feedback of the HF amplifier, one of the diagonals across the bridge being connected to the input and the other diagonal to one of the outputs of the HF amplifier. In the D.C. circuit the D.C. voltage appearing across resistor $P_M$ is applied through the potentiometer $P_N$ to the two voltage-dependent capacitors V to vary their capacitances in contrary directions.

The amplifier $A_1$ is a conventional HF amplifier such as a transistor having a resistor and shunting capacitor for the latter connected in the conductor to the emitter. Such an HF amplifier when inserted in the bridge circuit shown will begin to oscillate and deliver an amplitude the magnitude of which is a function of the state of balance of the bridge. The unshown primary cooperating with secondaries shown in $A_1$ provide the necessary inductance for oscillation.

What is claimed is:
1. A capacitive pick-off for converting a sensed physical quantity into an electrical signal comprising a substantially self-balancing bridge having in one side thereof a capacitive input member in the form of a mechanical differential capacitor having two essentially fixed plates and a relative- ly movable plate in capacitive relationship thereto, variations in said sensed quantity moving said movable plate to change the differential capacitance of the differential capacitor, the other side of the bridge including two voltage-sensitive capacitors serially connected in common direction and with a common junction, a source of direct current connected to the series of voltage-sensitive capacitors for applying a predetermined bias thereon, a high frequency oscillatory amplifier having two output portions for delivering high frequency current and having the input of the amplifier connected to the movable plate and said junction between the voltage sensitive capacitors as terminals of the output diagonal of the bridge, one portion of the amplifier output being connected to the bridge across the serially connected voltage-sensitive capacitors and to the respective fixed plates for high frequency feed back on the input diagonal of the bridge, the second portion of the amplifier output varying with the amplifier input, a rectifier for the second portion of amplifier output and connected thereto to produce an output direct current, resistor in the circuit of the direct current to produce a voltage drop across the resistor, one terminal of the resistor being connected to the junction between the voltage-sensitive capacitors and the other terminal of the resistor being connected to both outer terminals of the series of the voltage-sensitive capacitors, so that a voltage developed across the resistor will vary the predetermined bias on the voltage-sensitive capacitors contrarily with respect to each other and hence vary their capacitances for roughly balancing the bridge, the voltage varying the predetermined bias on the voltage sensing capacitors providing the required signal.

References Cited

UNITED STATES PATENTS

| | | | |
|---|---|---|---|
| 2,708,746 | 5/1955 | Shaw | 331—65 |
| 2,956,234 | 10/1960 | Olsen | 331—36 XR |
| 3,050,693 | 8/1962 | Sinninger | 331—36 XR |
| 2,476,496 | 1949 | Kliever | 324—61 |
| 2,542,372 | 1951 | Taylor | 328—1 |
| 2,726,544 | 1955 | Anastasia et al. | 328—1 |
| 2,968,031 | 1961 | Higa | 328—1 |
| 3,177,427 | 1965 | Kuntz et al. | 324—61 |
| 3,221,256 | 1965 | Walden | 328—1 |

OTHER REFERENCES

"Capacitive Transducers," Instruments and Control Systems, by Foldvari & Lion November 1964, pp. 77–85.

JOHN S. HEYMAN, Primary Examiner

H. A. DIXON, Assistant Examiner

U.S. Cl. X.R.

324—99, 61; 307—320